United States Patent [19]
Mizuta et al.

[11] Patent Number: 5,749,455
[45] Date of Patent: May 12, 1998

[54] METHOD AND APPARATUS FOR TRANSFERRING WORKPIECES

[75] Inventors: Akira Mizuta; Masazumi Ogawa, both of Kanagawa, Japan

[73] Assignee: Fuji Photo Film Co., Ltd., Kanagawa, Japan

[21] Appl. No.: 496,784

[22] Filed: Jun. 29, 1995

[30] Foreign Application Priority Data

Jul. 11, 1994 [JP] Japan ................... 6-159000

[51] Int. Cl.$^6$ ............................ B65G 15/14
[52] U.S. Cl. ............... 198/626.5; 198/728
[58] Field of Search ............... 198/626.5, 726, 198/725, 728

[56] References Cited

U.S. PATENT DOCUMENTS

| | | | |
|---|---|---|---|
| 3,314,521 | 4/1967 | Hollenton | 198/836.3 X |
| 3,325,977 | 6/1967 | Kirsten | 198/626.5 X |
| 4,508,210 | 4/1985 | Ramcke et al. | 198/626.5 |
| 4,641,742 | 2/1987 | Igarashi et al. | 198/626.5 |
| 4,874,067 | 10/1989 | Greenwell | 198/626.5 X |
| 5,067,607 | 11/1991 | Mizuta et al. | 198/733 |
| 5,137,140 | 8/1992 | Lecrone | 198/836.3 X |
| 5,145,053 | 9/1992 | Krieger et al. | 198/626.5 |
| 5,322,160 | 6/1994 | Markiewicz et al. | 198/836.3 |

*Primary Examiner*—D. Glenn Dayoan
*Attorney, Agent, or Firm*—Sughrue, Mion, Zinn, Macpeak & Seas, PLLC

[57] ABSTRACT

A method and apparatus for transferring a workpiece quickly and which can handle a variety of workpieces even of different outside sizes, and can accurately position workpieces. Workpieces on a transfer surface are adjusted in position to maintain an interval between the workpieces at a certain value. Along the transfer surface are disposed two belts on which are provided first and second holders raised above the transfer surface and which contact the workpiece at its front and rear edges. The holders, which are separately formed on the belt, cooperate with each other to hold the workpieces. The apparatus is also provided with a driving force which is able to change the rotational phase between the two belts. By changing the phase between the belts, the interval between the holders in the transfer direction can be varied in accordance with the size of the workpiece to be transferred.

18 Claims, 8 Drawing Sheets

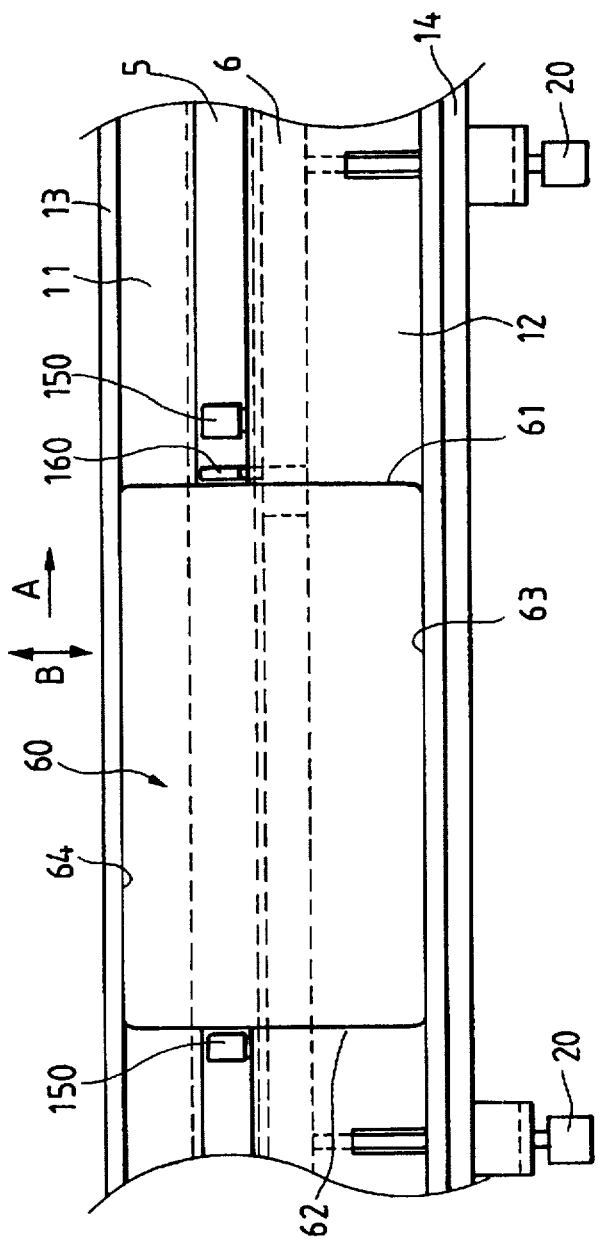

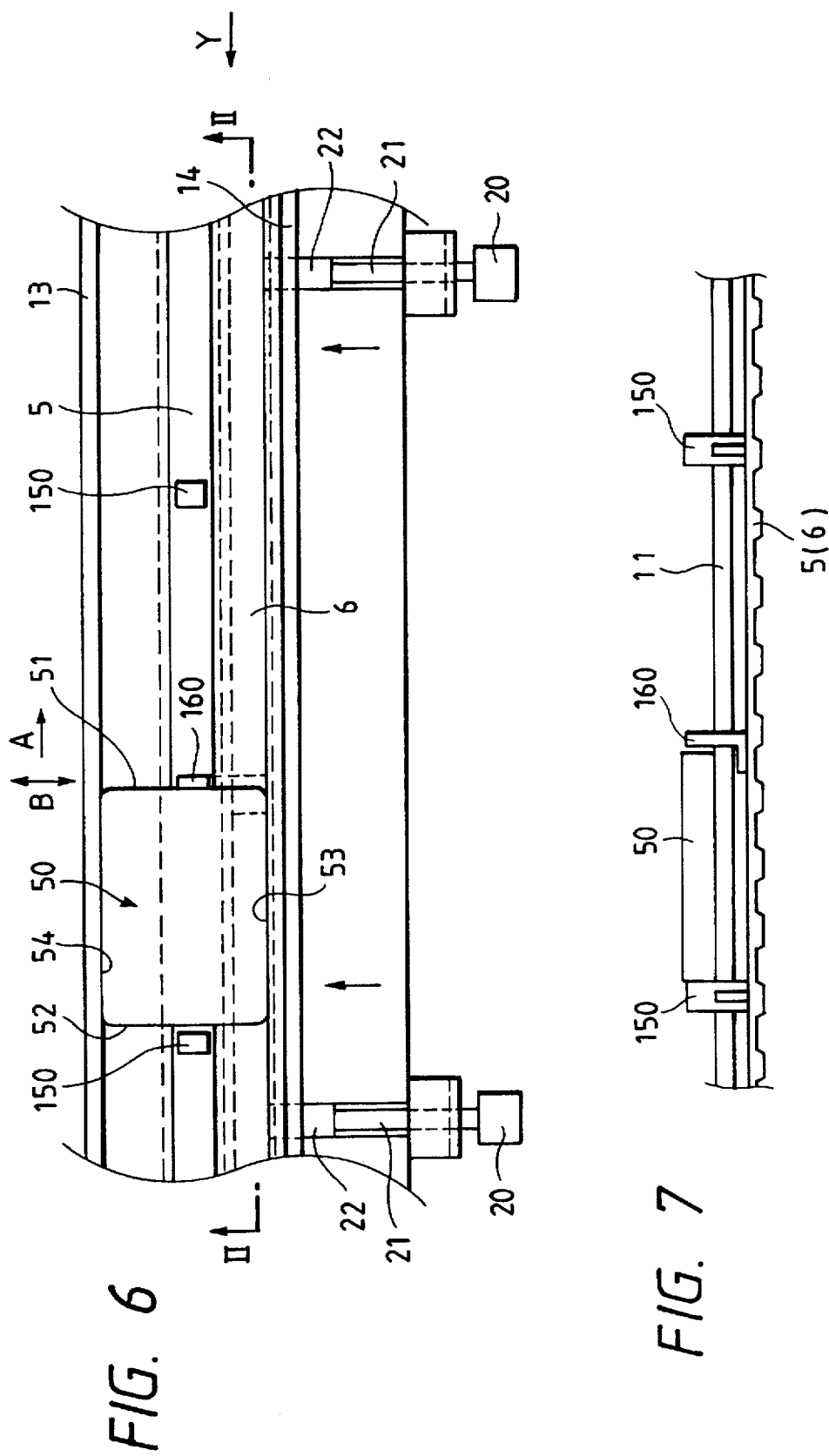

METHOD AND APPARATUS FOR TRANSFERRING WORKPIECES

BACKGROUND OF THE INVENTION

The present invention relates to a method and apparatus for transferring workpieces such as parts used for fabricating a final product and intermediate products in an assembly line. More particularly, the invention relates to such a method and apparatus for transferring relatively thin and, for instance, rectangular workpieces on a certain transfer surface with a predetermined interval being maintained between adjacent workpieces while the workpieces are being positioned in place.

Various automatic assembly lines have conventionally been used in a factory in which a variety of products are assembled. In general, such automatic assembly lines are used in combination with transferring lines. For instance, in order to transfer workpieces which have been assembled by a first automatic assembly machine to a second automatic assembly line, a transfer apparatus operable in accordance with the assembly speed of the first assembly machine is provided on the first automatic assembly machine in the vicinity of the second automatic assembly machine. There is further provided a feeding apparatus for feeding workpieces from the transfer apparatus to the second automatic assembly machine at a timing defined in accordance with the fabrication speed of the second automatic assembly machine.

Such a feeding apparatus is required to have high accuracy with respect to the transfer speed used to transfer workpieces and also with respect to the position to which workpieces are to be transferred. For this purpose, conventionally there has been used a so-called intermittent feeding apparatus which moves intermittently.

An intermittent feeding apparatus for use with an automatic assembly machine is known from Japanese Unexamined Utility Model Publication No. Hei. 5-9221, as illustrated in FIG. 11 herein, and Japanese Unexamined Utility Model Publication No. Hei. 5-89320, as illustrated in FIG. 12 herein.

As illustrated in FIG. 11 (Japanese Unexamined Utility Model Publication No. Hei. 5-92221), an intermittent feeding apparatus 100 transfers pallets 105, 106, 107 each having a jig 110, 111, 112 for fixing workpieces thereto, with a toothed belt 103 (timing belt), which extends around a drive gear 101 and a driven gear 102. In the apparatus 100, the pallets 105, 106, 107 are received on the belt, positioned by projections 104 fixed to the belt 103. In a feeding apparatus 200 illustrated in FIG. 12, projections 204 fixed on a toothed belt 203 contact rear edges of pallets 205, 206, 207 to thereby position the pallets on the belt 203.

When pallets are to be used in a feeding apparatus used for fabricating a wide variety of workpieces having different sizes, two methods have conventionally been used. In one method, the jigs 110 have a structure adjustable in accordance with the size of the workpieces, and further a pallet has a size which allows a maximum or smaller size of a workpiece to be positioned thereon. In the other method, several sizes of pallets are prepared and a pallet is selected and used in accordance with the size of the workpiece to be transferred.

Thus, in the conventional apparatus, the pallet was required to be modified to make it possible to use the pallet for either a large or a small workpiece, or the pallet was required to have a relatively complicated adjusting structure. Since adjustment operations equal in number to the number of pallets must be performed, such adjustment operations are quite troublesome. In addition, the adjustment accuracy is required to be high, which places a heavy burden on the operator. In the method in which several pallets are exchanged in accordance with the size of the workpiece, some pallets are wastefully not used. In such a case, an additional storage area is necessary for pallets not in use, resulting in higher costs and lowered productivity.

SUMMARY OF THE INVENTION

In view of the above-mentioned problems in the prior art, it is an object of the present invention to provide a method and an apparatus for transferring a workpiece, which method and apparatus can quickly and easily deal with a variety of workpieces even of different outside sizes, and further can accurately position the workpieces.

The above-mentioned object is achieved by a method for transferring a plurality of workpieces in one direction with a predetermined interval being kept between adjacent workpieces, the method characterized in that each workpiece is transferred with front and rear edges thereof being held by first transfer means moving while holding a front edge of each workpiece and second transfer means moving while holding a rear edge of each workpiece, front and rear being defined as viewed from the direction in which the workpieces are transferred.

The above-mentioned object is achieved also by the above-mentioned method further characterized in that each workpiece is transferred with left and right edges thereof being positioned in place, left and right being defined as viewed from a direction in which the works are transferred.

The above-mentioned object is further achieved by an apparatus for transferring a plurality of workpieces in one direction with a predetermined interval being kept between adjacent workpieces, the apparatus characterized by first transfer means having a plurality of first holding means fixed thereon with the predetermined interval being kept between adjacent first holding means, the first holding means positioning a front edge of each workpiece, front being defined as viewed from the direction in which the workpieces are transferred, and second transfer means having a plurality of second holding means fixed thereon with the predetermined interval being kept between adjacent second holding means, the second holding means positioning a rear edge of each workpiece, rear being defined as viewed from the direction in which the workpieces are transferred, the first transfer means and second transfer means being movable in parallel with each other, and the positional relationship of the first holding means and the second holding means relative to each workpiece being adjustable.

The above-mentioned object is achieved also by the above-mentioned apparatus further characterized by a pair of side guides positioning left and right edges of the workpieces, left and right being defined as viewed from the direction in which the workpieces are transferred, the distance between the pair of side guides being variable.

BRIEF DESCRIPTION OF THE DRAWINGS

FIG. 5 is a plan view illustrating a state in which a workpiece having a different size is positioned in the transferring apparatus in accordance with the embodiment of FIG. 1;

FIG. 6 is a plan view illustrating a state in which a workpiece having a different size is positioned in the transferring apparatus in accordance with the above embodiment;

FIG. 7 is a partial cross-sectional view taken along a line II—II in FIG. 6;

DESCRIPTION OF THE PREFERRED EMBODIMENTS

Hereinbelow is described a first embodiment with reference to FIGS. 1 to 9, in which is shown a transferring apparatus for transferring relatively thin and substantially rectangular workpieces such as upper and lower halves of a magnetic disc cassette.

Figure 1:
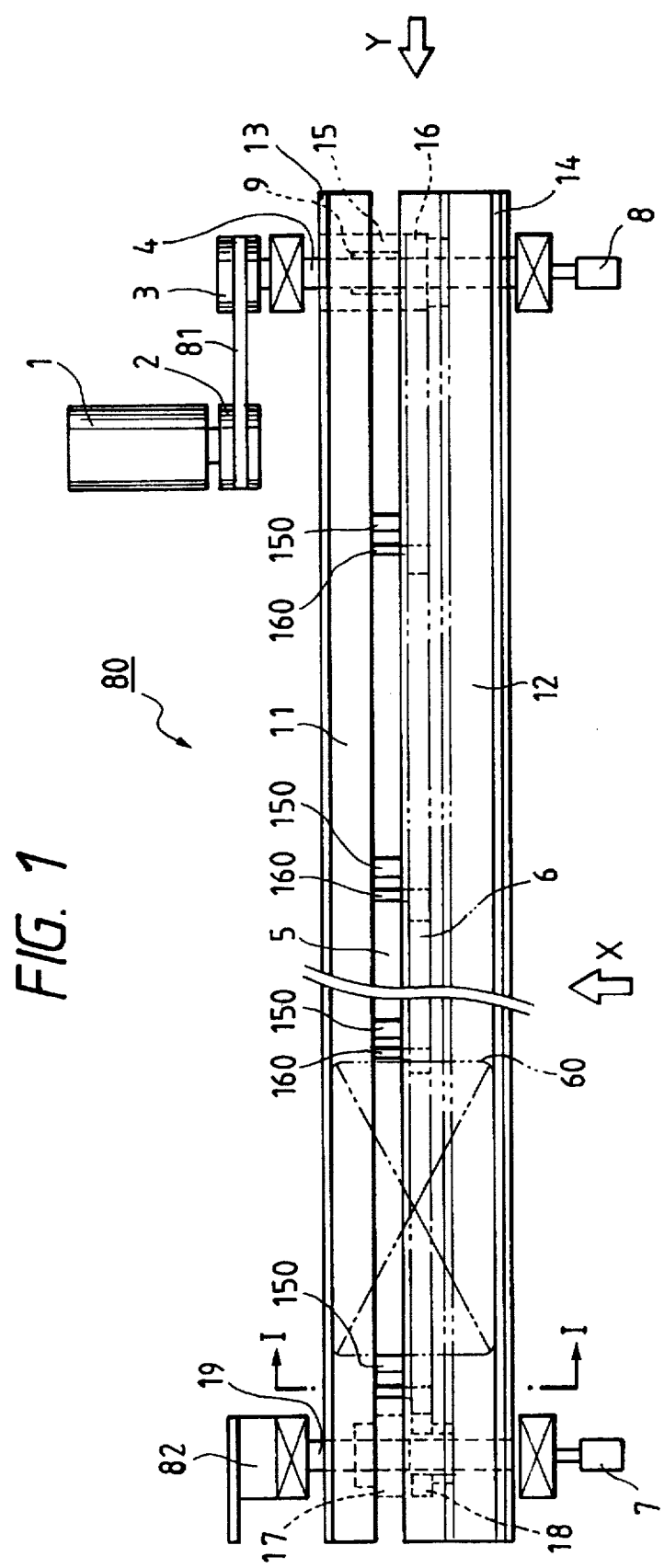
FIG. 1 is a plan view illustrating a transferring apparatus constructed in accordance with a preferred embodiment of the present invention.
Figure 2:
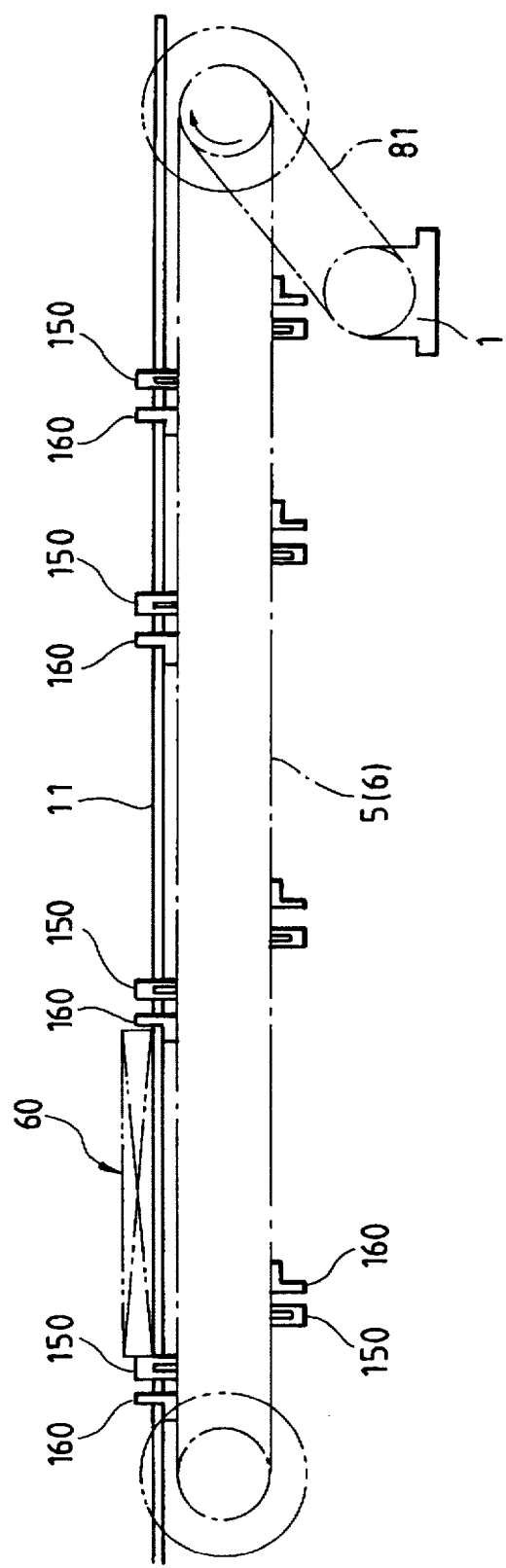
FIG. 2 is a front view as viewed from a direction X in FIG. 1.
Figure 3:
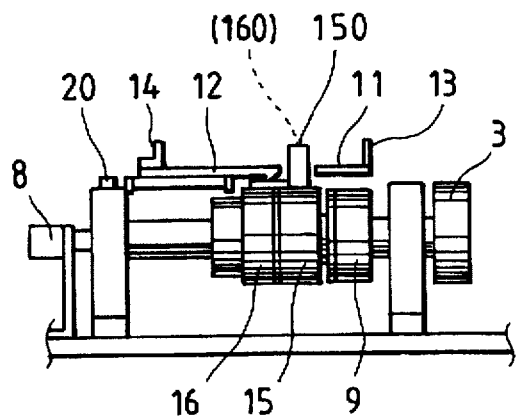
FIG. 3 is a side view as viewed from a direction Y in FIG. 1.
Figure 4:
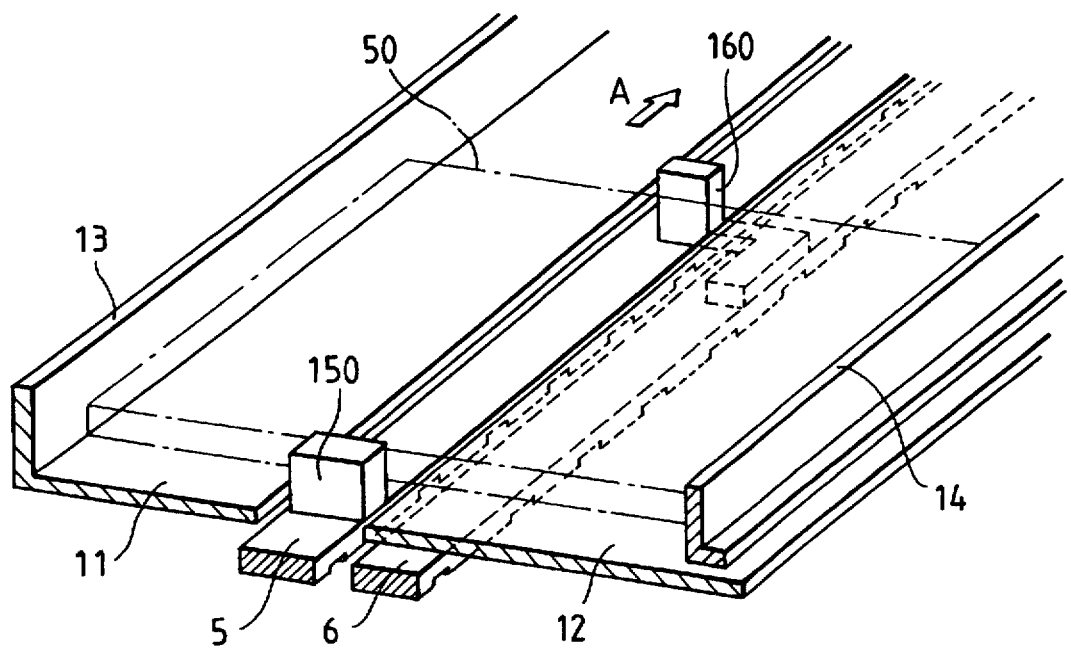
FIG. 4 is a perspective view taken along the line I—I in FIG. 1.
Figure 8:
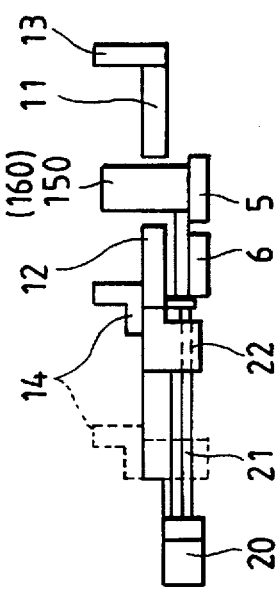
FIG. 8 is a side view as viewed from a direction Y in FIG. 6.
Figure 9:
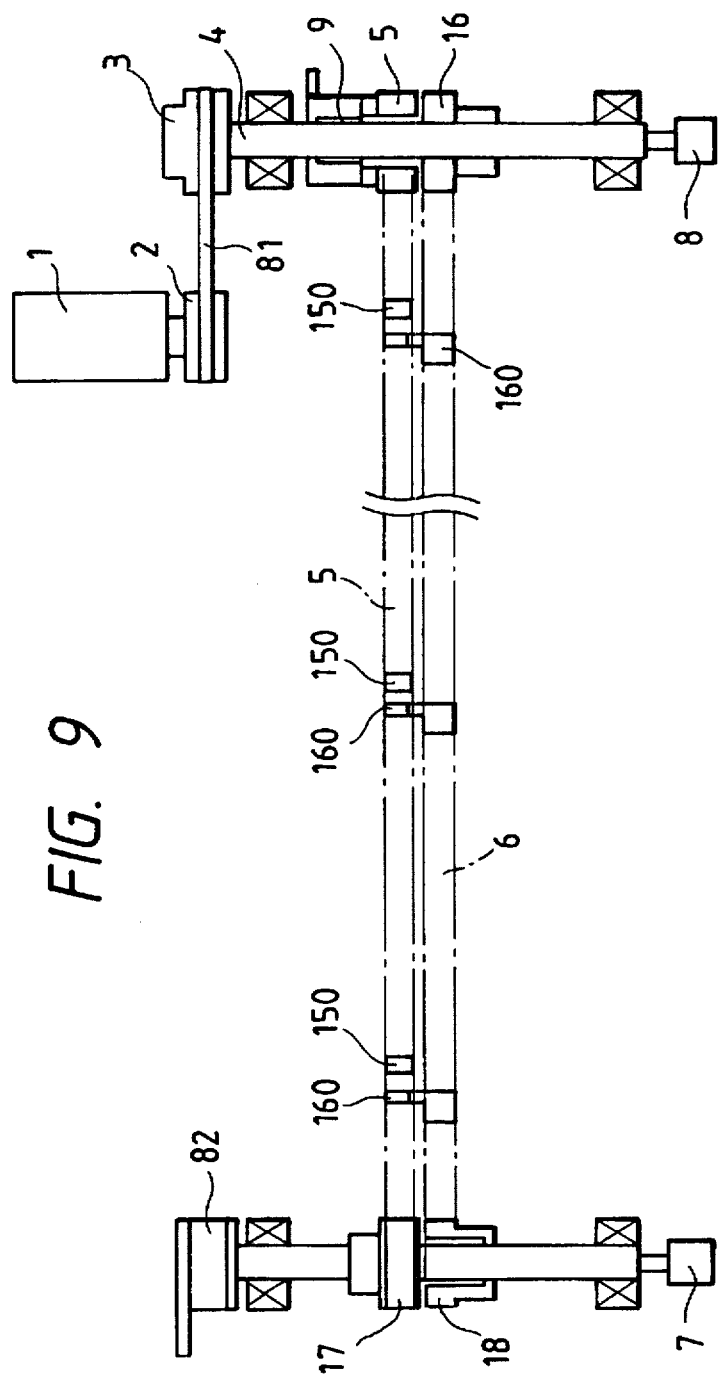
FIG. 9 is a plan view illustrating a driver element to be used in another embodiment.

FIG. 1 is a plan view illustrating a transferring apparatus constructed in accordance with a preferred embodiment of the present invention, FIG. 2 is a front view as viewed from a direction X in FIG. 1, FIG. 3 is a side view as viewed from a direction Y in FIG. 1, and FIG. 4 is a perspective view taken along the line I—I in FIG. 1. FIGS. 5 and 6 are plan views both illustrating a workpiece having a different size positioned in the transferring apparatus in accordance with the embodiment of FIG. 1. FIG. 7 is a partial cross-sectional view taken along the line II—II in FIG. 6. FIG. 8 is a side view as viewed from a direction Y in FIG. 6. FIG. 9 is a plan view illustrating only a driver element to be used in the embodiment of FIG. 1.

The first embodiment is described hereinbelow with reference to the drawings.

A workpiece 50 having a smaller size or a workpiece 60 having a larger size to be transferred is here assumed to be rectangular in shape (thin and substantially rectangular parallelopiped), having front and rear edges 51, 52 or 61, 62 and right and left side edges 53, 54 or 63, 64 as seen in plan view, as shown in FIGS. 6 and 5, respectively. A transferring apparatus 80 in accordance with the embodiment can transfer workpieces on a transfer surface with certain intervals between adjacent workpieces with front and rear edges and, if necessary, right and left side edges of the workpieces being adjusted in position.

With reference to FIG. 1, a rotational power source 1 (an AC servomotor or a step motor or the like) supplies driving power to a drive shaft 4 through a timing belt 81 serving as means for transmitting driving power, and pulleys 2 and 3 having teeth in mesh with the timing belt 81. Between the drive shaft 4 and a driven shaft 19 are spanned a second endless-belt 5, embodying the second transfer means, and a first endless-belt 6, embodying the first transfer means, each having teeth similar to the timing belt 81.

The drive shaft 4 is provided with a clutch 9 which can engage and release a drive pulley 15 of the second belt 5 to or from the drive shaft 4, while a drive pulley 16 of the first belt 6 is fixed to the drive shaft. The drive shaft 4 is further provided with a device such as a rotary encoder 8 for indicating the position of the first endless-belt 6.

A driven pulley 18 of the first endless-belt 6 is rotatably supported on the driven shaft 19, and a driven pulley 17 of the second endless-belt 5 is fixed to the driven shaft 19. The driven shaft 19 is provided with a device such as a rotary encoder 7 for indicating the position of the second endless-belt 5. The driven shaft 19 is further provided with a brake 82 for stopping the second endless-belt 5 at a desired location, while the second endless-belt 5 is stopped and is out of engagement with the drive shaft 4.

As mentioned previously, the second endless-belt 5 and the first endless-belt 6 are implemented with a timing belt, and first holding means 160 and second holding means 150 positioning front and rear edges 51, 52 or 61, 62 of the workpieces 50 or 60 are arranged to extend above bottom guide plates 11 and 12 from a space between the two guide plates 11 and 12 which cooperate with each other to form a transfer surface. Herein, "front" and "rear" are defined as viewed from the direction in which the workpieces are to be transferred. At left and right side of the bottom guide plates 11 and 12 are disposed side guides 13 and 14 extending along the transfer direction to enhance the stability of transfer of the workpieces.

As shown in FIG. 4, for instance, the first holding means 160 formed on the first endless-belt 6 is structured to have a bend so that the first holding means extends above the second endless-belt 5. Thus, the second holding means 150 formed on the second endless-belt 5 and the first holding means 160 formed on the first endless-belt 6 cooperate with each other to interpose a workpiece therebetween on the second endless-belt.

Next, with reference to FIGS. 5 to 9 there will be explained an exchange operation carried out when workpieces of different sizes are to be transferred.

With reference to FIG. 5, a workpiece 60 having a relatively large size is transferred while being interposed between the holding means 150 and 160 positioned on the second and first endless-belts 5 and 6, respectively, in a transfer direction (A). In a direction (B) perpendicular to the transfer direction (A), the workpiece 60 is interposed between the side guide 13 formed on the bottom guide plate 11 and the side guide 14 movable in the direction (B).

In the exchange operation for transferring the workpiece 50 which, as illustrated in FIG. 6, has a smaller outside size than the workpiece 60 illustrated in FIG. 5, with reference to FIG. 9, the drive motor 1 is held stopped and the brake 82, which may be an electromagnetic brake, is excited with respect to the transfer direction (A).

Then, the second endless-belt 5 is released from engagement with the clutch 9, whereupon the second belt 5 is cut off from the rotary power source. The rotary encoder 7 detects and stores the position of the second endless-belt 5 at that time. Then, the drive motor 1 is rotated in a reverse direction at low speed, and is stopped when the difference between the positional angle of the rotary encoder 8 linked with the drive shaft 4 and the positional angle of the rotary encoder 7 arranged for the second endless-belt 5 reaches a predetermined value. Thereby, it is possible to set the phase angle between the belts 5 and 6 at a desired value.

For instance, if the encoder 7 indicates 358 degrees and the angle of the small-sized workpiece 50 is 176 degrees, the encoder 8 is rotated in a reverse direction to a position corresponding to (358−176=) 182 degrees, and then made to stop. Hereinafter, the second endless-belt 5 is again engaged with the engagement clutch 9 to thereby make it possible to set the interval between the holding means 150 and 160 in the transfer direction at a value suitable for the small-sized workpiece 50.

It should be noted that the engagement clutch 9 for engaging the second endless-belt 5 with the drive shaft 4 may preferably be an electromagnetic clutch which is excited when a current flowing thereinto is cut off.

In the direction (B) perpendicular to the transfer direction, the workpieces are supported with an appropriate interval between the side guides 13 and 14 maintained. Namely, in the exchange operation for transferring a small-sized workpiece 50 as illustrated in FIG. 6 in place of the large-sized workpiece 60 as illustrated in FIG. 5, the side guide 14 is moved by a driver means 20 to a predetermined position and fixed at that position.

The driver means 20 may be implemented, for instance, with a motor, and may have a structure in which a male-threaded shaft 21 rotated by the motor is threadedly joined to a female thread 22 fixed to the side guide 14.

In accordance with the operation described above, a change of setting can be carried out quickly and accurately using only an easy exchange operation for workpieces having different sizes within a maximum pitch at which the holding means 150 and 160 can be disposed in the transfer direction (A) and also within a range of movement of the side guide 14 in the direction (B) perpendicular to the transfer direction.

Figure 10:
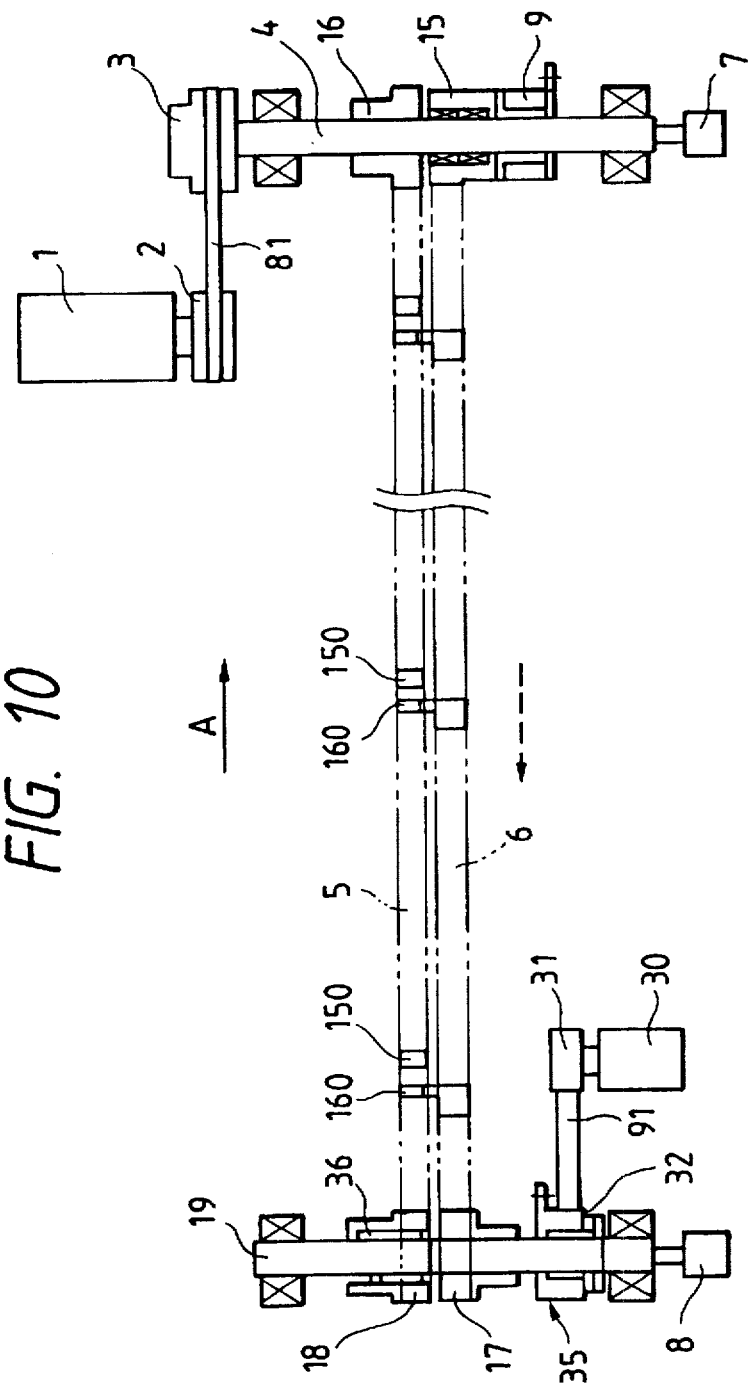
FIG. 10 is a plan view illustrating a driver element to be used in still another embodiment.
Figure 11:
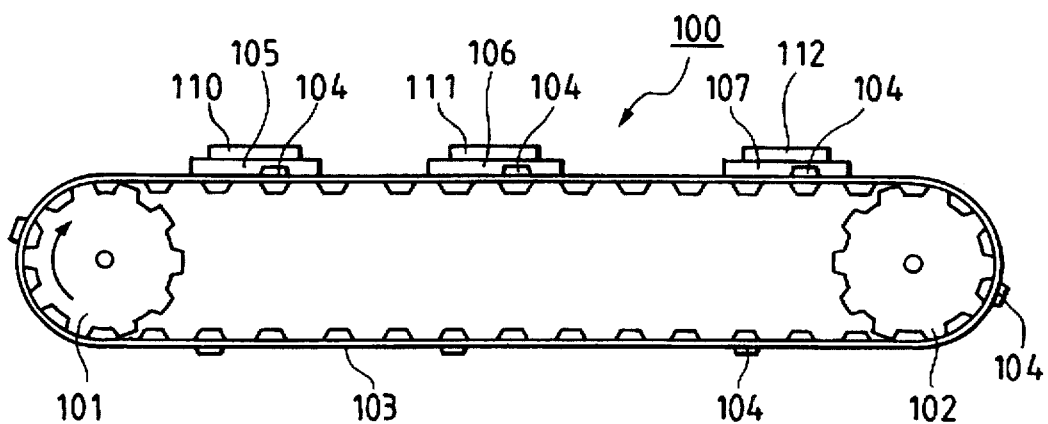
FIG. 11 is a side view illustrating a conventional transferring apparatus.
Figure 12:
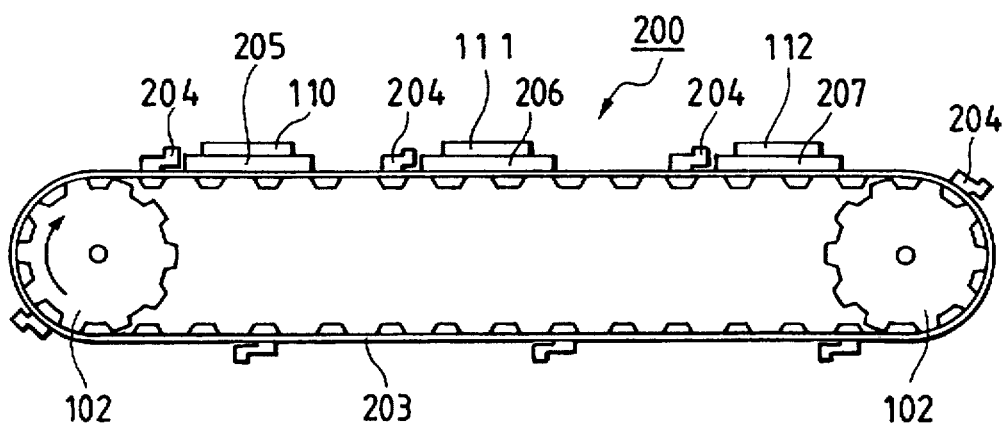
FIG. 12 is a side view illustrating a conventional transferring apparatus.

FIG. 10 illustrates a second embodiment constructed in accordance with the invention. The apparatus illustrated in FIG. 10 differs from the first embodiment with respect to the drive system, and accordingly a plan view showing the drive system of the second embodiment is presented.

In the second embodiment, similarly to the first embodiment, power is transmitted from the drive motor 1 to the drive shaft 4. The drive shaft 4 is provided with the drive pulley 16 for the second belt 5, the drive pulley 15 for the first belt 6, and the clutch 9 engaging and releasing the drive pulley for the first belt 6 to and from the drive shaft 4.

The drive shaft 4 is further provided with the rotary encoder 7 for indicating the position on the second belt 5. The driven pulley 18 of the second belt 5 is secured to the driven shaft 19 for rotation by means of a bearing 36, whereas the driven pulley 17 of the first belt 6 is fixedly secured to the driven shaft 19. The driven shaft 19 is further provided with a clutch 35 for engaging and releasing an auxiliary rotational power source 30 (for instance, a servomotor and the like) to or from the driven shaft. A pulley 32 is in communication with a pulley of the auxiliary power source 30 through a timing belt 91 and the clutch 35. The driven shaft 19 is provided further with the rotary encoder 8 for indicating the position of the first belt 6.

In the second embodiment having the above-described structure, the interval between the holding means formed on the transfer belt in the transfer direction (A) may be varied as desired. Namely, in the second embodiment, while the second belt 5 and the drive motor 1 are stopped, the clutch 35 is excited and thereby engaged to the drive shaft 19, and then the first belt is moved by the auxiliary power source 30 in a direction reverse to the transfer direction (A) until the difference between the standard encoder 7 and the auxiliary encoder 8 becomes a predetermined value. Thus, the interval between the holding means 150 and 160 can be easily varied.

In a third embodiment in accordance with the invention, means for measuring the interval between the first and second holding means 150 and 160 (for instance, a scale, a jig or the like) and the clutch 9 as shown in FIGS. 9 and 10 are fixed in place by means of a mechanical engagement element (for instance, a clamp ring, a span ring, a split clamp device or the like) in which the position at which a shaft and a pulley is fixed is not limited. Thus, the interval between the holding means 150 and 160 is set to a desired value without use of rotary encoders.

In a fourth embodiment in accordance with the present invention, the holding means 150 and 160 are kept spaced from each other at a selected distance using a fixing jig (for instance, a fixed pin sized to fit into a plurality of holes, a ratchet pawl or the like) which can engage the clutch 9 illustrated in FIGS. 9 and 10 only at a plurality of predetermined locations.

In the above-mentioned embodiments, the workpiece to be transferred is thin and substantially rectangular in shape as viewed from the top. However, it should be noted that application of the invention is not limited to such a workpiece, and the invention can be applied to anything which can be transferred with front and rear edges and left and right side edges thereof adjusted in position.

As described in detail, the transferring apparatus in accordance with the invention includes the first and second holding means which are raised above the transfer surface and are designed to contact a workpiece at front and rear edges thereof, and holds the workpiece in the front-rear direction thereof by means of the first and second transfer means movable relative to each other in the direction in which the workpiece is to be transferred. Thus, when a different-sized workpiece is to be transferred, the interval between the holding means is adjusted in accordance with the size of the workpiece by varying the phase between the first and second transfer means. In addition, since the interval between the side guides, which position the workpiece at left and right side edges of the workpiece, where "left" and "right" are defined as viewed from the transfer direction, is variable, it is possible to hold a workpiece more firmly in accordance with the size of a workpiece to be transferred.

Thus, in accordance with the invention, a workpiece can be transferred with the workpiece being interposed and thereby fixed between the two holding means disposed on the first and second transfer means (belts). In addition, it is also possible to quickly and accurately position a workpiece using an AC servomotor or stepper motor or like as a power source. Thus, it is now possible to easily change the setting for transfer, and rapidly transfer workpieces having different sizes. Since, unlike prior art, the invention requires no jig such as a pallet, the invention provides the advantage that an apparatus for transferring workpieces having different sizes can be fabricated at a lower cost.

What is claimed is:

1. In a method for transferring a plurality of workpieces in one direction with a predetermined interval being maintained between adjacent workpieces, the improvement wherein each workpiece is transferred with front and rear edges thereof being held by a first transfer means and a second transfer means, respectively, wherein said first and second transfer means respectively hold said front and rear edges, said front and rear being defined as viewed from a direction in which said workpieces are transferred, wherein a drive means includes a drive shaft and a driven shaft for moving said first and second transfer means together in said conveyance direction and for moving only one of said first and second transfer means to change the distance there between and wherein detecting means detects the rotary position of said drive shaft and said driven shaft to determine a position of said first and second transfer means.

2. The method for transferring a plurality of workpieces as recited in claim 1, wherein each workpiece is transferred with left and right edges thereof positioned in a first and second side guide, said left and right being defined as viewed from a direction in which said workpieces are transferred, and wherein another drive means adjusts a distance between said side guides.

3. An apparatus for transferring a plurality of workpieces in one direction with a predetermined interval being maintained between adjacent workpieces, said apparatus comprising:

a first transfer means having a plurality of first holding means fixed thereon with said predetermined interval being kept between adjacent first holding means, said first holding means positioning a front edge of each workpiece, said front being defined as viewed from a conveyance direction in which said workpieces are transferred;

a second transfer means having a plurality of second holding means, said second holding means positioning a rear edge of each workpiece, said rear being defined as viewed from a conveyance direction in which said workpieces are transferred; and a drive means including a drive shaft and a driven shaft for moving said first and second transfer means together in parallel in said conveyance direction and for moving only one of said first and second transfer means to change the distance therebetween, wherein both of said drive shaft and said driven shaft have an encoder for detecting the rotary position of said drive shaft and said driven shaft to determine a position of said first and second transfer means.

4. The apparatus for transferring a plurality of workpieces as recited in claim 3, further comprising a first and second side guides positioning left and right edges of said workpieces, said left and right being defined as viewed from a direction in which said workpieces are conveyed, a distance between said side guides being variable.

5. The apparatus for transferring a plurality of workpieces as recited in claim 3, wherein said first transfer means comprises a first endless-belt spanned between a first drive pulley fixed to said drive shaft and a first driven pulley rotatably supported on said driven shaft, said second transfer means comprises a second endless-belt spanned between a second drive pulley supported on said drive shaft through a clutch and a second driven pulley fixed to said driven shaft, and said first holding means is formed on said first endless-belt and said second holding means is formed on said second endless-belt.

6. The apparatus for transferring a plurality of workpieces as recited in claim 5, wherein said driven shaft comprises a brake for stopping a rotation thereof.

7. The method for transferring a plurality of workpieces as recited in claim 1, wherein said first transfer means comprises a first endless-belt spanned between a first drive pulley fixed to said drive shaft and a first driven pulley rotatably supported on said driven shaft;

said second transfer means comprises a second endless-belt spanned between a second drive pulley supported on said drive shaft through a clutch and a second driven pulley fixed to said driven shaft;

said first holding means is formed on said first endless-belt and said second holding means is formed on said second endless-belt wherein said first and second holding means are aligned in a direction which is parallel to said conveyance direction; and said first and second holding means are arranged to extend above a first and second bottom guide plate.

8. The method for transferring a plurality of workpieces as recited in claim 7, wherein said driven shaft of said drive means comprises a brake for stopping a rotation thereof.

9. The method for transferring a plurality of workpieces as recited in claim 1, further comprising steps of said drive means stopping one of said first transfer means and said second transfer means while moving the other, and defining a space between a first holding means and a second holding means for holding said respective workpiece.

10. The method for transferring a plurality of workpieces as recited in claim 8, wherein said driven shaft of said drive means is stopped rotating by the brake, said second endless-belt is stopped by releasing the said clutch while said drive shaft is kept rotating thereby to keep driving said first endless-belt, and a space is defined between said first holding means and said second holding means for holding said respective workpiece.

11. The method for transferring a plurality of workpieces as recited in claim 10, wherein each of said detecting means comprises a rotary encoder, and said space is determined between said first holding means and said second holding means by signals generated from said rotary encoders.

12. The apparatus for transferring a plurality of workpieces as recited in claim 5, wherein said drive means comprises said drive source, said drive shaft, said first and second drive pulleys and said clutch.

13. The apparatus for transferring a plurality of workpieces as recited in claim 12, wherein said drive source comprises a motor and a timing belt which drive said drive shaft.

14. The method for transferring a plurality of workpieces as recited in claim 7, wherein said drive means comprises said drive source, said drive shaft, said first and second drive pulleys and said clutch.

15. The method for transferring a plurality of workpieces as recited in claim 14, wherein said drive source comprises a motor and a timing belt which drive said drive shaft.

16. The apparatus for transferring a plurality of workpieces as recited in claim 4, wherein said first and second holding means extend above a first and second bottom guide plate, wherein said first holding means is formed with a bend so that said first and second holding means are aligned in a direction which is parallel to said conveyance direction.

17. The apparatus for transferring a plurality of workpieces as recited in claim 16, wherein said first side guide is attached to said first bottom guide plate and said second side guide is movable across said second bottom guide plate; and a common drive means for adjusting said second side guide relative to said first guide.

18. In a method for transferring a plurality of workpieces in one direction with a predetermined interval being maintained between adjacent workpieces, the improvement wherein each workpiece is transferred with front and rear edges thereof being held by a first transfer means and a second transfer means, respectively, wherein said first and second transfer means respectively hold said front and rear edges, said front and rear being defined as viewed from a direction in which said workpieces are transferred and wherein a common drive means moves said first and second transfer means together in said conveyance direction and moves only one of said first and second transfer means to change the distance there between.

* * * * *